(No Model.) 2 Sheets—Sheet 1.

H. SCHULZE-BERGE.
APPARATUS FOR THE MANUFACTURE OF GLASSWARE.

No. 493,302. Patented Mar. 14, 1893.

WITNESSES:

INVENTOR

ATTORNEYS.

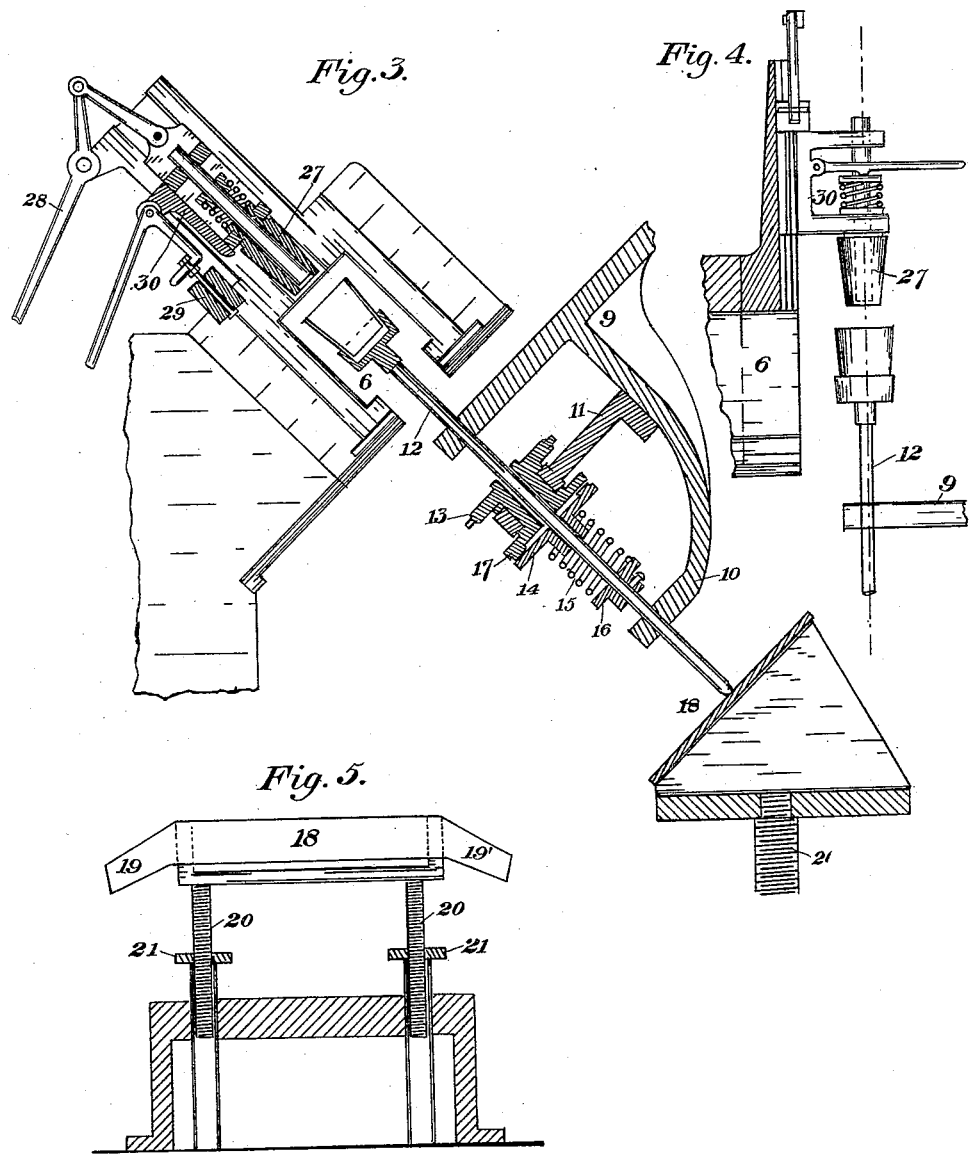

UNITED STATES PATENT OFFICE.

HERMANN SCHULZE-BERGE, OF BROOKLYN, NEW YORK.

APPARATUS FOR THE MANUFACTURE OF GLASSWARE.

SPECIFICATION forming part of Letters Patent No. 493,302, dated March 14, 1893

Application filed September 19, 1891. Serial No. 406,287. (No model.)

*To all whom it may concern:*

Be it known that I, HERMANN SCHULZE-BERGE, a citizen of the Empire of Germany, and a resident of Brooklyn, in the county of Kings and State of New York, have invented a new and useful Improvement in Apparatus for the Manufacture of Glassware, of which the following is a specification.

My invention, which relates to an improvement in the reheating and finishing of glassware, comprises an improved reheating furnace and mechanism for presenting thereto the glassware to be reheated. It is illustrated in the accompanying two sheets of drawings, in which—

Figure 1:
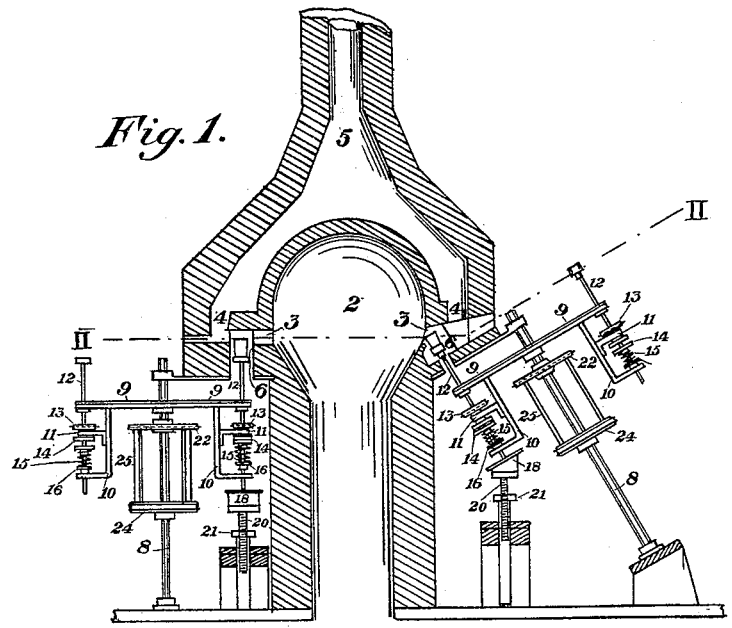
Figure 2:
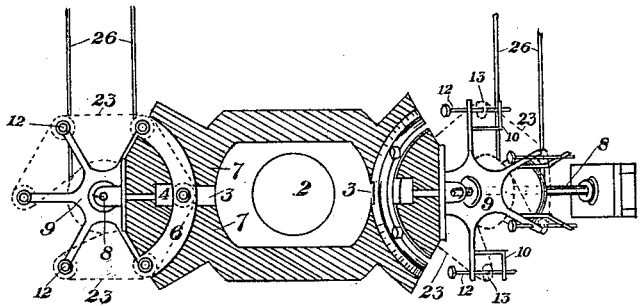

Figure 1 is a vertical central section of the furnace and apparatus. Fig. 2 is a horizontal section on the line II—II of Fig. 1. The figures on Sheet 2 are on a larger scale. Fig. 3 shows the finishing apparatus in vertical section, and the flues for the passage of the glassware in end view. Fig. 4 is a front elevation of part of the subject of Fig. 3. Fig. 5 shows in elevation, partly in vertical section, an inclined guide-way forming part of the apparatus and hereinafter particularly described.

Like symbols of reference indicate like parts in each figure.

As shown in the drawings, (Figs. 1 and 2) the reheating furnace has a fire-chamber 2 from which the gases of combustion issue through a discharge opening or openings 3, and pass by way of flues 4 into the stack 5. A peculiar feature of construction of the furnace is that the gases of combustion, on their way to the stack, cross arched flues 6, which constitute covered passage ways through which the glass articles are introduced to be subjected to the heat of the furnace. The flue 6 is separated from the fire-chamber by a refractory wall 7, and for only part of its length is it connected to the fire-chamber by the opening or openings 3, which serve the function of glory-holes and through which the heat issues upon the glass articles passing through the flue beneath or in front of said opening. The parts of the flue beyond said opening, on both sides thereof, become heated only moderately, and thus serve to heat the glass articles slowly during their passage to the opening and to cool them slowly during their passage from the same after the heating of the article when in opposition to the glory-hole. This construction of heating furnaces is new broadly and is of great utility in facilitating the heating of glassware and in saving breakage.

In order to introduce the glass articles to the heating action of the furnace, I prefer to use the mechanism shown at the right hand side of Fig. 1. The mechanism shown on the other side is similar in construction, but is differently arranged, the supporting device at the right being inclined, and the other being vertical.

Referring to the right side of Figs. 1 and 2; 8 is a main shaft or axle, having radiating arms 9, the number of which may vary according to the specific purpose for which the apparatus is to be used. In Fig. 2 I show the shaft 8 provided with six arms having brackets 10 and 11. The glass-supporting rods 12 are journaled in the arms 9 and brackets 10; and sprocket-wheels 13 are journaled by necks in the brackets 11. The supporting-rods pass freely and loosely through the hubs of their respective sprocket wheels. In order to rotate the supporting rods I provide each with a clutch or friction-disk 14 connected with or resting upon a spring 15 which is secured at its lower end to a collar 16, fastened to the supporting rod, preferably by a screw or other adjustable device. The clutch or friction disk is adapted to engage the lower end 17 of the hub of the sprocket wheel upon raising the supporting-rod, and such connection causes the supporting rod to be rotated by the rotation of the sprocket wheel. The supporting rod is prevented from too great downward longitudinal motion in its bearings 9 and 10 by the collar 16.

To raise the supporting rod to bring its end to the plane of the glory-hole and passage 6, I employ a guide-plane 18 having an inclined surface 19, which in the lateral motion of the supporting rod hereinafter explained engages and lifts it, thereby forcing the clutch-disks 14 and 17 into contact, as illustrated in Figs. 3 and 5. After the supporting rod has been thus raised by the incline 19, a level portion of the guide maintains it in elevated position until it reaches the other end of the guide (the delivery end of the passage 6) where a reversely inclined portion 19' permits it to descend and causes the parts of the clutch to separate. The guide 18 may be adjusted by elevating or depressing it by means of screws 20 and nuts 21.

22 is a sprocket-wheel set loosely and revolubly on the shaft 8 in the plane of the sprocket-wheels 13, and a chain or belt 23 connects the latter sprocket-wheels in a single circuit with the central sprocket wheel 22, which is driven by a wheel 24, to which it is connected by rods or brackets 25. The wheel 24 is rotatory on the shaft 8 at a lower plane than the lower ends of the supporting rods, and is driven by a belt 26, (Fig. 2,) which may derive its motive power from any suitable source. If it be desired to drive the supporting rods continuously, the sprocket-wheels 13 may be fixed directly to the supporting-rods, and the clutch mechanism and guide-way 18 may be omitted. I may also use ordinary grooved pulleys and leather belting instead of the sprocket chains and wheels.

The advantage which results from an inclined position of the glass article while exposed to the action of heat, as shown at the right hand side in Figs. 1 and 2, is that in such position the edges of the glass articles are better presented to the heat and gases of combustion while passing around them, and that they thereby become more quickly fire-melted than if exposed to the heat in a vertical position, as shown on the left hand side of these figures. They can also be heated more strongly and therefore can take a better fire-polish, because the action of the weight of the softening glass edge is such that it counteracts in course of its revolution the flaring and cupping effect which tends to occur when the rim or edge is in the lower and in the higher position, so that the articles will stand a higher heat without deforming.

In Figs. 3 and 4 a finishing apparatus is shown attached to the exit of the flue 6, consisting of a mandrel or plunger 27 mounted upon the slide 30, which can be lowered by the hand-lever 28 into contact with the glass article to shape the inner part thereof, while a forming roller 29 attached to and movable with the slide 30 can be forced against the outside of the glass article while the supporting rod with the article is revolving. The plunger 27 is journaled by a neck in the bracket of the slide 30, and a rod is longitudinally movable through the plunger to knock off the glass article if it should shrink or stick upon the plunger. The hand-operated roller 29 is not shown in Fig. 4, it being hidden by the plunger 27. In operating the apparatus the shaft 8 is turned by hand intermittently, and each time only so far as to bring the next following arm or supporting rod in front of the glory-hole, the arms 9 or brackets 10 serving the purpose of a handle to move the shaft, while the pulley 24 and sprocket-wheel 22 are revolved by motive power. In place of a single glory-hole 3 connecting the flue 4 with the fire-chamber, two or more glory-holes may conduct the gases of combustion from the fire-chamber to the flue and chimney and across the passage-way 6 through which the glass articles are carried.

Those skilled in the art will be able to modify the construction and relative arrangement of the parts of my improvement in various ways without departure from the principles of the invention as stated in the following claims.

I claim—

1. In apparatus for reheating glassware, the combination of a glory-hole furnace, a rotatory shaft having transversely projecting arms, spindles journaled in the arms substantially parallel with the shaft, and driving mechanism for the spindles, comprising a driving wheel rotatory on the shaft's axis and connected with wheels on the spindles; substantially as and for the purposes described.

2. In apparatus for reheating glassware, a glory-hole furnace having a fire-chamber, and a laterally inclosed passage-way for the glass articles, said passage being open on its under side and at both ends, and adapted to permit the entrance of a glass article at one end and its exit at the other end, and being connected for a portion only of its length with the fire chamber by a glory-hole; substantially as and for the purposes described.

3. In apparatus for reheating glassware, a glory-hole furnace having a fire-chamber, and a covered and laterally inclosed passage-way for the glass articles, a discharge-flue for the products of combustion, and openings connecting said passage-way with the discharge-flue and with the fire-chamber at the middle portion only of the passage-way said passage way having openings at its ends adapted for the entrance and exit of the glass articles; substantially as and for the purposes described.

4. In apparatus for reheating glassware, a glory-hole furnace having a fire-chamber, and a covered and laterally inclosed passage-way for the glass articles, said passage way being connected for a portion only of its length with the fire chamber, by a glory-hole, in combination with supporting-rods, and means for moving them through said passage-way said passage having openings at its ends adapted for the entrance and exit of the glass articles; substantially as and for the purposes described.

5. In apparatus for fire-finishing glassware, a glory-hole furnace provided with a fire-chamber, and a covered and lateral passage-way for the glass articles to be reheated separated from the fire-chamber by refractory walls, and a discharge-opening or flue from the fire-chamber crossing or intersecting with the upper part of the passage-way, in combination with a revoluble series of laterally movable individually revoluble supporting rods for the glass articles; substantially as and for the purposes described.

6. In apparatus for reheating and fire-melting glassware, a glory-hole furnace provided with a fire-chamber and a glory-hole accessible through a lateral covered passage-way for the glass articles, in combination with a revoluble series of arms in which are journaled individually rotatory supporting rods for the support of the glass articles said rods being set in inclined positions; substantially as and for the purposes described.

7. In apparatus for fire-finishing glassware, a glory-hole furnace in combination with an axle or shaft provided with a plurality of arms and a plurality of spindles journaled in said arms, and driving mechanism to revolve the spindles, consisting of a pulley revoluble loosely around the axle or shaft and attached to a sprocket-wheel which connects the wheels of the various spindles by a continuous belt or chain; substantially as and for the purposes described.

8. In apparatus for reheating and fire-melting glassware, a revoluble main shaft or axle provided with arms a plurality of supporting spindles journaled in said arms, and driving-wheels revoluble loosely around each of the spindles, each of which driving-wheels is provided with a clutch-disk, a yieldingly supported corresponding clutch-disk connected to the spindles, and means adapted to raise the spindles with the clutch-disk individually to engage with the driving-wheels; in combination with a loosely revoluble driving-wheel on the main shaft adapted to actuate simultaneously all the driving-wheels of the spindles independently of the turning of the main shaft; substantially as and for the purposes described.

9. In apparatus for reheating and finishing glassware, a glory-hole furnace provided with a covered circular flue separated from the fire-chamber by refractory partitions or walls but connected with the fire-chamber by an opening adapted to afford heat to the circular flue, which flue constitutes a lateral passageway for the glass objects and which is adapted to reheat the glassware during its passage through the flue gradually, and after the fire-melting has taken place to allow the articles to cool off, in combination with mechanical means, substantially as described, to revolve the glass articles during their passage through said flue; substantially as and for the purposes described.

10. In apparatus for reheating and finishing glassware, a glory-hole furnace and an intermittently revoluble axle or shaft provided with a series of laterally movable revoluble supporting rods provided at one end with a support for the glass articles, and a platform or guide in the path of the other end of the supporting rods, adapted to move the supporting rods longitudinally in their bearings; substantially as and for the purposes described.

11. In apparatus for reheating and finishing glassware, a glory-hole furnace and an intermittently revoluble axle or shaft having a series of laterally movable revoluble supporting-rods, adapted to be moved in succession through the furnace, and a finishing-tool, comprising a plunger and exterior roller, situate at the place of exit of the rods from the furnace and movable into engagement with the glass articles as they reach the exit; substantially as and for the purposes described.

12. In apparatus for reheating and finishing glassware, a glory-hole furnace and an intermittently revoluble axle or shaft having a series of laterally movable revoluble supporting rods, adapted to be moved in succession through the furnace, and a finishing tool, situate at the place of exit of the rods from the furnace and movable into engagement with the glass articles as they reach the exit; substantially as and for the purposes described.

In testimony that I claim the foregoing as my invention I have signed my name, in presence of two witnesses, this 16th day of September, 1891.

HERMANN SCHULZE-BERGE.

Witnesses:
WM. M. DUNN,
F. C. NIBLO.